(12) United States Patent
Lemons

(10) Patent No.: US 7,772,476 B2
(45) Date of Patent: *Aug. 10, 2010

(54) DEVICE AND METHOD FOR VISUALIZING MUSICAL RHYTHMIC STRUCTURES

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,286

(22) Filed: Jun. 15, 2009

(65) Prior Publication Data

US 2009/0249941 A1 Oct. 8, 2009

Related U.S. Application Data

(62) Division of application No. 12/023,375, filed on Jan. 31, 2008, now Pat. No. 7,589,269.

(60) Provisional application No. 60/921,578, filed on Apr. 3, 2007.

(51) Int. Cl.
G09B 15/00 (2006.01)
(52) U.S. Cl. .................................................. 84/470 R
(58) Field of Classification Search .............. 84/470 R, 84/484, 483.2, 464 R, 477 R
See application file for complete search history.

(56) References Cited

U.S. PATENT DOCUMENTS

| | | |
|---|---|---|
| 2,804,500 A | 8/1957 | Giacoletto |
| 3,969,972 A | 7/1976 | Bryant |
| 4,128,846 A | 12/1978 | Robinson, Jr. |
| 4,172,406 A | 10/1979 | Martinez |
| 4,257,062 A | 3/1981 | Meredith |
| 4,378,466 A | 3/1983 | Esser |
| 4,526,168 A | 7/1985 | Hassler et al. |
| 4,887,507 A | 12/1989 | Shaw |
| 4,907,573 A | 3/1990 | Nagasaki |

(Continued)

FOREIGN PATENT DOCUMENTS

EP 0349686 A1 1/1990

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner*—Kimberly R Lockett
(74) *Attorney, Agent, or Firm*—Woodard, Emhardt, Moriarty, McNett & Henry LLP

(57) ABSTRACT

The present disclosure relates to methods and devices for visualizing the rhythmic structure of musical compositions. Circular symmetry and geometric shapes are utilized to visualize representations of rhythmic structures about a central axis. In general, lower frequency rhythm instruments are represented by small geometric shapes, while relatively higher frequency instruments are represented by shapes of larger diameter. The visualizations can be presented in two or three dimensions and may incorporate the use of animation. The result is a graphical representation that is more intuitive and entertaining than traditional music notation.

7 Claims, 8 Drawing Sheets

U.S. PATENT DOCUMENTS

| | | | |
|---|---|---|---|
| 5,048,390 | A | 9/1991 | Adachi et al. |
| 5,207,214 | A | 5/1993 | Romano |
| 5,370,539 | A | 12/1994 | Dillard |
| 5,415,071 | A | 5/1995 | Davies |
| 5,563,358 | A | 10/1996 | Zimmerman |
| 5,741,990 | A | 4/1998 | Davies |
| 5,784,096 | A | 7/1998 | Paist |
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,350,942 | B1 | 2/2002 | Thomson |
| 6,390,923 | B1 | 5/2002 | Yoshitomi et al. |
| 6,392,131 | B2 | 5/2002 | Boyer |
| 6,411,289 | B1 | 6/2002 | Zimmerman |
| 6,448,487 | B1 | 9/2002 | Smith |
| 6,686,529 | B2 | 2/2004 | Kim |
| 6,750,386 | B2 | 6/2004 | King |
| 6,791,568 | B2 | 9/2004 | Steinberg et al. |
| 6,856,329 | B1 | 2/2005 | Peevers et al. |
| 6,927,331 | B2 | 8/2005 | Haase |
| 6,930,235 | B2 | 8/2005 | Sandborn et al. |
| 7,030,307 | B2 | 4/2006 | Wedel |
| 7,096,154 | B1 | 8/2006 | Andrade-Cetto |
| 7,153,139 | B2 | 12/2006 | Wen et al. |
| 7,182,601 | B2 | 2/2007 | Donnan |
| 7,212,213 | B2 | 5/2007 | Steinberg et al. |
| 7,271,329 | B2 | 9/2007 | Franzblau |
| 7,400,361 | B2 | 7/2008 | Noske et al. |
| 7,589,269 | B2 * | 9/2009 | Lemons .................. 84/483.2 |
| 2003/0205124 | A1 | 11/2003 | Foote et al. |
| 2004/0206225 | A1 | 10/2004 | Wedel |
| 2005/0190199 | A1 | 9/2005 | Brown et al. |
| 2005/0241465 | A1 | 11/2005 | Goto |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0314228 | A1 | 12/2008 | Dreyfuss et al. |

FOREIGN PATENT DOCUMENTS

| | | | |
|---|---|---|---|
| EP | 456 860 | A1 | 11/1991 |
| EP | 1354561 | A1 | 10/2003 |
| JP | 05-232856 | | 9/1993 |
| JP | 2004-226556 | A | 8/2004 |
| KR | 10-2006-0110988 | | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curves/harmonograph/, pp. 1-6, printed Aug. 30, 2007.

Dunne, Gabriel, "Color/Shape/Sound Radio & Symmetry Calculator", Quilime.com—Symmetry Calculator, https://www.quilime.com/conent/colorcalc/, pp. 1-6, printed Jul. 3, 2007.

Notification of Transmittal International Preliminary Report on Patentability for International Application No. PCT/US07/15822, dated Oct. 23, 2008.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/5075.

Patent Application Search Report mailed on Aug. 28, 2008 for PCT/US2008/005077.

Patent Application Search Report mailed on Jul. 31, 2008 for PCT/US2008/005070.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application search Report mailed on Sep. 29, 2008 for PCT/US2008/005074.

Rabiner, Huang, "Fundamentals of Speech Recognition," PTR Prentice Hall, Inc., 1993, ISBN 0-13-285826-6, pp. 21-31; 42-68 and Fig. 2.17, 2.32.

Patent Application Search Report mailed on Aug. 25, 2009 for PCT/US2009/000684.

Written Opinion mailed on Aug. 25, 2009 for PCT/US2009/00684.

* cited by examiner

US 7,772,476 B2

DEVICE AND METHOD FOR VISUALIZING MUSICAL RHYTHMIC STRUCTURES

CROSS-REFERENCE TO PRIOR APPLICATION

The present application is a divisional application based on U.S. application Ser. No. 12/023,375, filed Jan. 31, 2008 now U.S. Pat. No. 7,589,269 entitled "Device and Method for Visualizing Musical Rhythmic Structures," which claims the benefit of U.S. Provisional Patent Application Ser. No. 60/921,578 filed Apr. 3, 2007 entitled "Device and Method for Visualizing Musical Rhythmic Structures", both of which are hereby incorporated by reference in their entireties.

TECHNICAL FIELD OF THE DISCLOSURE

The present disclosure generally relates to sound analysis and, more specifically, to a device and method for depicting musical rhythmic structures in two or three dimensions.

BACKGROUND OF THE DISCLOSURE

Musical compositions include two main types of information. First, are the sounds played or generated at certain pitches. Second, are the rhythms characterized by the duration of the individual sounds and the time intervals therebetween. Brass, woodwind and string instruments as well as many electronic instruments generate sounds having a specific pitch (and often various overtones of those pitches) played in certain rhythmic patterns. Music written for such instruments is typically written on a staff with a time signature, clef, key signature and note symbols. The note symbols include bodies placed on specific lines or spaces within, above or below the staff to indicate the primary pitch being sounded. The relative duration of each such sound is represented by whether the body of the note is filled and by the presence or absence of stems and flags extending from the note body. Some percussion instruments such as bells, xylophone, vibraphone, piano, and guitar, for example, generate specific tones and their overtones. Music for these percussive instruments is typically notated in the same fashion as music for brass, woodwind, and string instruments.

Other percussion instruments such as drums and cymbals, while typically tuned to a general frequency range, primarily contribute to the rhythmic structure of music. FIG. 1 shows a typical musical transcription 100 written for a single percussion instrument, such as a bass drum, using a single line 102 with a time signature 104 utilizing notes 106 and rests 108 similar to those used for other instruments.

Drum sets utilized in popular music typically include several percussive instruments that are played by a single drummer. These drum sets may include one or more bass drums played with a kick pedal, a snare drum, a floor tom, one or more rack toms, a hi-hat cymbal played with a foot pedal and sticks, and one or more ride or crash cymbals. Other percussive instruments such as a cow bell, wood block and/or tambourine may also be included in a drum set. Rather then writing music for each individual percussive instrument in a drum set utilizing the format of FIG. 1, music 200 for the drum set is typically written using staff 202, time signature 204, standard notes 224, 230, 232 and 234, percussive notes 226 and 228, and rests 208 as shown, for example, in FIG. 2.

While the percussive music notation format 200 is not completely standardized, it is generally accepted that a single line 212 or space 214 within, above or below the staff 202 is designating the instrument 216 that is notated by its associated space 214 or line 212. It is also generally accepted that the lower sounding instruments are assigned lines 212 or spaces 214 closer to the bottom of the staff 202 while higher sounding instruments are assigned lines 212 or spaces 214 near the top or above the staff 202.

Drum kits are usually "tuned" using keys to tighten the heads of the drum. The drums in a drum kit are tuned relative to each other so that the bass drum is tuned the lowest and the snare drum is tuned the highest. The order of relative tuning of drums from lowest to highest is the bass drum, floor tom, rack tom and snare. The music written in FIG. 2 is for a drum set having a bass drum, a floor tom, a rack tom, a snare drum, a hi-hat cymbal and a crash cymbal.

Communicative rhythm is a necessary and important part of all musical instruction. The disclosed device and method for visualization of musical rhythm structures may be utilized in conjunction with, or separate from, the Apparatus and Method for Visualizing Musical Notation ("the Master Key™ concept") disclosed in U.S. application Ser. No. 11/827/264, filed on Jul. 11, 2007, the disclosure of which is hereby incorporated by reference. While the Master Key™ concept uses geometry, color, circular efficiency and interchangeable 2-3 dimensions to communicate the spatial tonal relationships of musical notes in a non-standard manner, the Rhythmical Visualization system and method disclosed herein may use, in one embodiment, circular geometry, white light, and interchangeable 2-3 dimensions to communicate rhythm in an equally novel and powerful manner. These two components (the Master Key™ concept and disclosed rhythmical visualization method and system) may overlap and reinforce one another, providing many novel ways to increase production in musical composition, performance, communication, understanding and enjoyment.

SUMMARY OF THE DISCLOSURE

Accordingly, in one embodiment, a method for visualizing musical rhythmic structures is disclosed, comprising the steps of: (a) receiving an input representing an occurrence of a musical rhythmic event; (b) assigning a visual representation to said input; and (c) displaying said visual representation about a central axis on a display.

In another embodiment, (1) the visual representation comprises a first substantially circular shape having a first maximum diameter if the input represents the sounding of a first rhythmic instrument; said first rhythmic instrument having a first primary frequency; (2) the visual representation comprises a second substantially circular shape if said input represents the sounding of a second rhythmic instrument; said second rhythmic instrument having a second primary frequency that is higher than said first primary frequency; said second substantially circular shape having a second maximum diameter which is greater than said first maximum diameter; and (3) said visual representation comprises a third substantially circular shape if said input represents the sounding of a third rhythmic instrument; said third rhythmic instrument having a third primary frequency that is higher than said second primary frequency; said third substantially circular shape having a third maximum diameter which is greater than said second maximum diameter.

In another embodiment, a method for visualizing musical rhythmic structure is discloses, comprising the steps of: (a) receiving an input representing an occurrence of a musical rhythmic event; (b) assigning a visual representation to said input; and (c) displaying said visual representation along a time axis in two dimensions on a display; wherein: said visual representation comprises a first rectangular shape having a first height and first width if said input represents the sounding of a first rhythmic instrument; said first rhythmic instrument having a first primary frequency; (e) said visual representation comprises a second rectangular shape having a second height and second width if said input represents the sounding of a second rhythmic instrument; said second rhythmic instrument having a second primary frequency that is higher than said first primary frequency; said second rectangular shape having a second height which is greater than said first height; and (f) said visual representation comprises a third rectangular shape having a third height and third width if said input represents the sounding of a third rhythmic instrument; said third rhythmic instrument having a third primary frequency that is higher than said second primary frequency; said third rectangular shape having a third height which is greater than said second height.

DETAILED DESCRIPTION OF THE VARIOUS EMBODIMENTS

For the purposes of promoting an understanding of the principles of the disclosure, reference will now be made to certain embodiments thereof and specific language will be used to describe the same. It will nevertheless be understood that no limitation of the scope of the disclosure is thereby intended, such alterations, further modifications and further applications of the principles of the invention as described herein being contemplated as would normally occur to one skilled in the art to which the disclosure relates.

As will be apparent from the disclosure contained herein, the present invention will find application in any field where the identification and analysis of sound is useful. Most of the described embodiments relate to the use of the systems and methods of the present invention for the visualization of musical rhythmic structures, as that is a significant application for the present invention. However, the repeated references to music are for convenience of description, and those with ordinary skill in the art will recognize that the present invention may be applied to many other fields besides music.

What is described in the main embodiments herein is a set of mathematically based diagrams that can be used to explain and teach the theory and application of musical rhythmic structures from the most basic to the most complex, as well as to visualize musical rhythms for entertainment purposes. Both geometric form and, in certain embodiments, the color spectrum are used to visually present rhythmic structures and patterns in a totally new format. This representation, which may include the use of animation, allows the user to see the structure of musical rhythms in real time and in a much more intuitive format than that which is previously known in the art.

Figure 3:
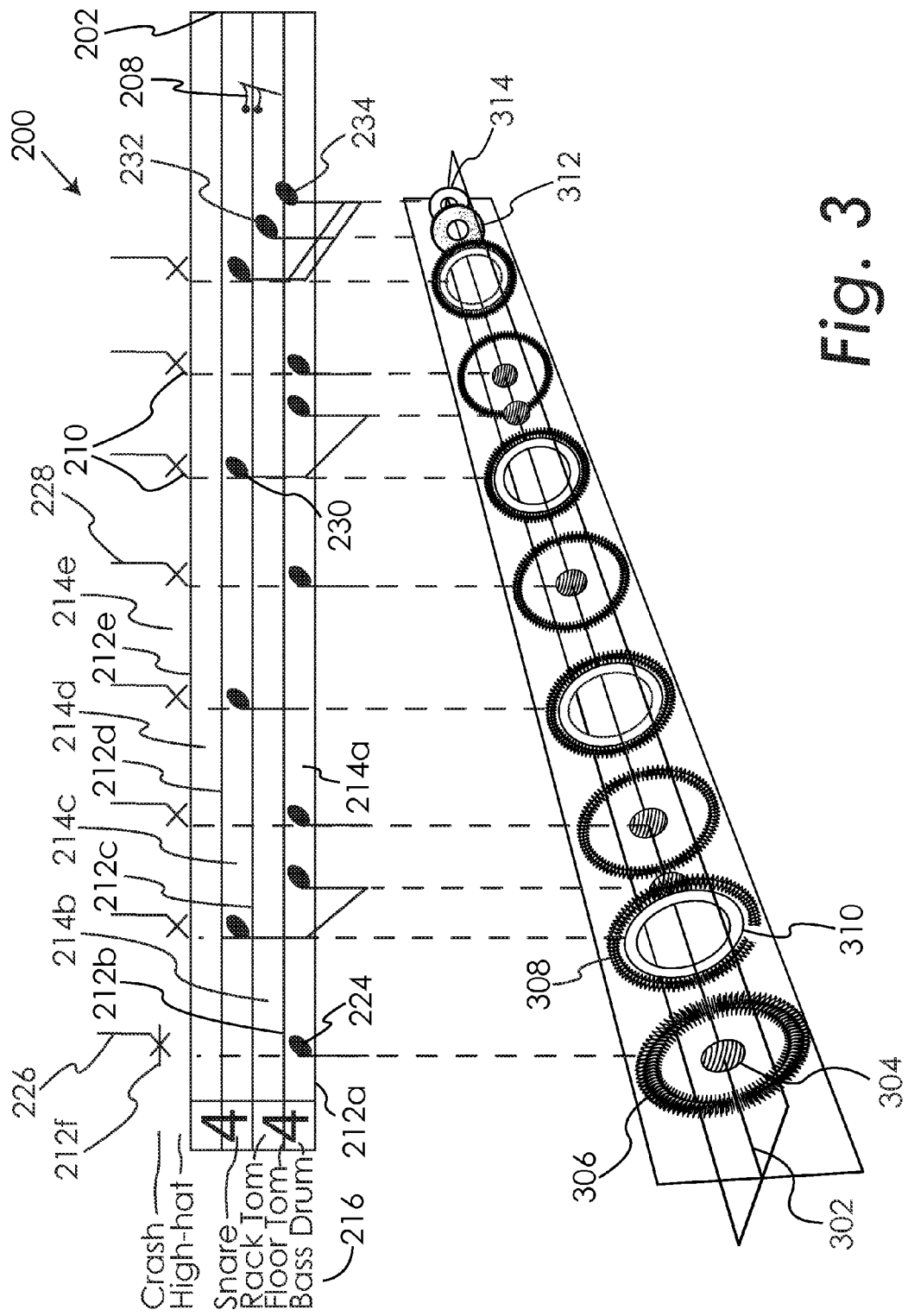
FIG. 3 is a perspective view of the visual representation of percussive music according to the disclosure shown with associated standard notation for the same percussive music.

FIG. 3 shows one embodiment of the present invention which utilizes spheroids 304 and toroids 306, 308, 310, 312 and 314 of various shapes and sizes in three dimensions placed along a time line 302 to represent the various rhythmic components of a particular musical composition. The lowest frequencies or lowest instrument in the composition (i.e. the bass drum) will appear as spheroids 304. As the rhythmical frequencies get higher in range, toroids 306, 308, 310, 312 and 314 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. In certain embodiments, spheroids 304 may be implements as perfect spheres, general spheroids, or as rounded disks. Those skilled in the art will recognize that other geometric shapes may be utilized to represent the sounds of the instruments within the scope of the disclosure. For example, other "non-rounded" shapes such as triangles, rectangles, or other polygons with circular or rotational symmetry (tetrahedrons, hexahedrons, or other solids in three dimensions) can be used to represent rhythmic structures using the disclosed system and method.

Figure 4:
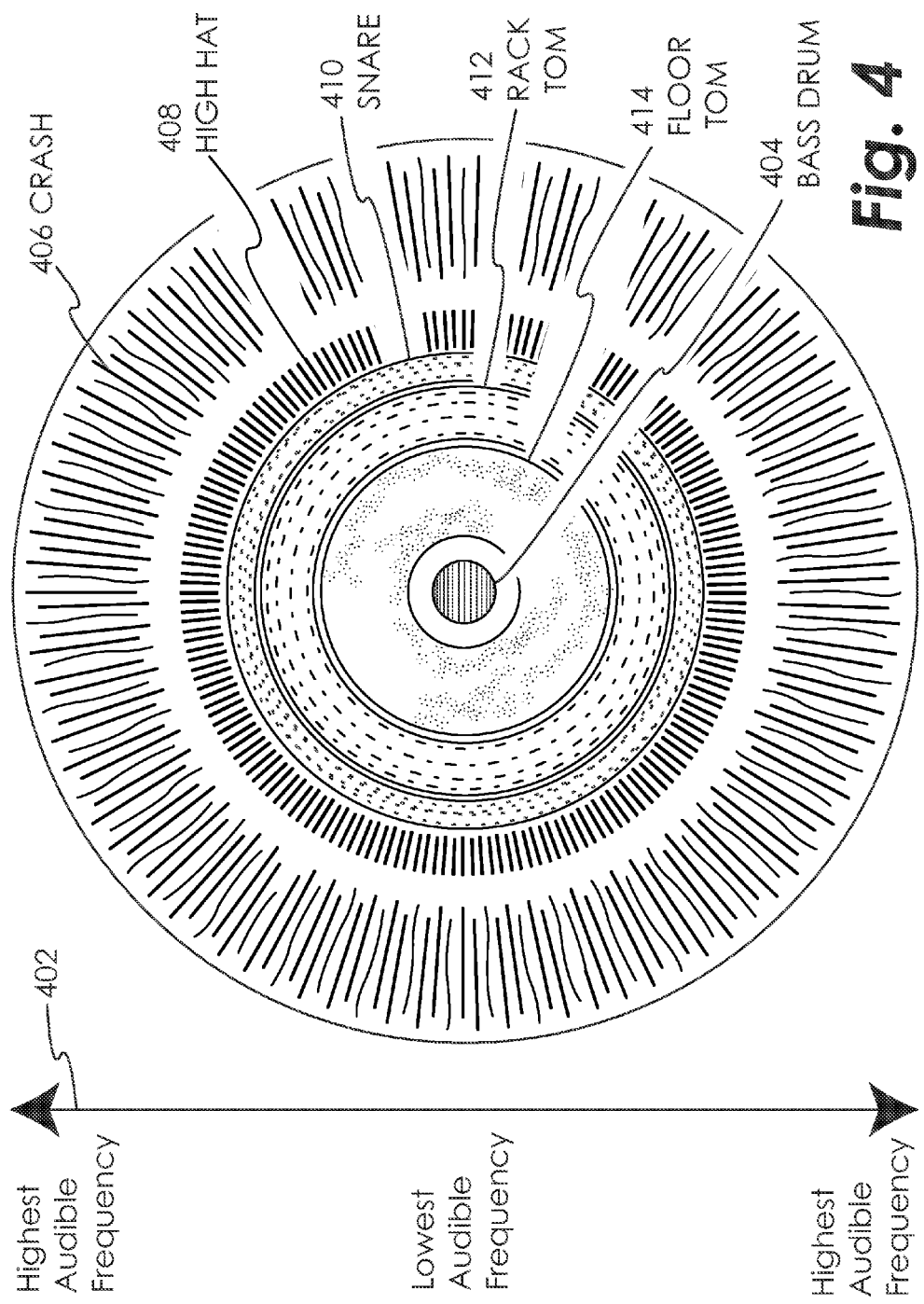
FIG. 4 is a two dimensional view looking along the time line of a visual representation of percussive music at an instant when six percussive instruments are being simultaneously sounded.

FIG. 4 shows another embodiment of the present invention which utilizes a two-dimensional view looking into the time line 302. In this embodiment, the spheroids 304 and toroids 306, 308, 310 and 312 from FIG. 3 correspond to circles 404 and rings 406, 408, 410 and 412, respectively. The lowest frequencies (i.e. the bass drum) will appear as a solid circle 404 in a hard copy embodiment. Again, as the relative frequency of the sounded instrument increases, the maximum diameter of the circle or ring used to depict the sounding of the instrument also increases, as shown by the scale 402.

The two-dimensional view of FIG. 4 may also be particularly useful when animated. For example, the various shapes representing rhythmic elements can be displayed to the user as they occur in real time. Each instance of a particular element will appear for a specific time, and then fade into the background display color over a predetermined or user-specified decay time. The low-frequency bass drum may then appear as a solid circular burst of white light and look much like a heart beating when displayed to the user on a video monitor. For very fast tempo music, the decay time could preferably be set to be very short. For slower tempo music, the decay time could likewise be made longer. In other embodiments, the system may automatically sense the tempo of the music and set the decay time accordingly. In other embodiments, the various spheroids and rings may remain on the screen and be highlighted or otherwise visually enhanced as they are sounded.

Figure 5:
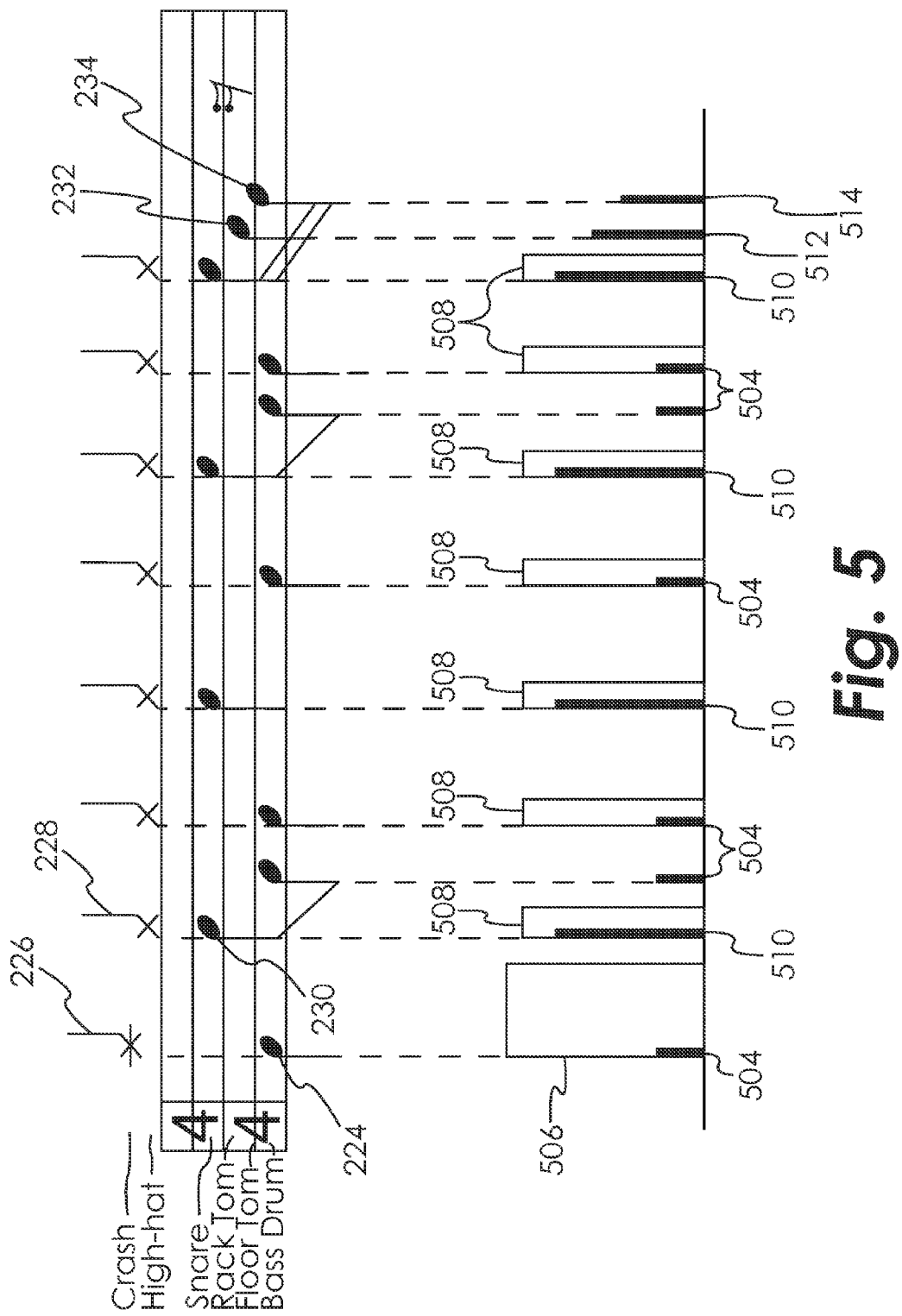
FIG. 5 is a two dimensional view looking perpendicular to the time line of the visual representation of percussive music according to the disclosure associated with standard notation for the same percussive music of FIG. 3.

FIG. 5 shows another embodiment of the present invention which utilizes a two dimensional view taken perpendicular to the time line 302. In this view, the previously seen circles, spheroids, rings or toroids turn into bars of various height and thickness. Spheroids 304 and toroids 306, 308, 310, 312 and 314 from FIG. 3 correspond to bars 504, 506, 508, 510, 512, and 514 in FIG. 5. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. To enhance the visual effect when multiple instruments are played simultaneously, certain bars may be filled in with color or left open. For example, the bar 504 representing the bass drum may be darkened in order to be visually distinguishable when displayed within the "open" bar 506 representing a simultaneously sounded crash cymbal. In other embodiments, the color or shading scheme may be set up so that all drums are represented by darkened bars, while bars representing cymbals are left open. These adjustments may optionally be adjustable by the user as well.

The spatial layout of the two dimensional side view shown in FIG. 5 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 504 (representing the bass drum) would be converted to a note 224 in the lowest space 214a of staff 202. Likewise, bar 510 (representing the snare drum) would be converted to a note 230 in the second highest space 214c of staff 202. This two dimensional "layout" of rhythmical notation will be very helpful to music lovers, as the entire structure of a song can then be viewed or even modified, at once, from a single location.

Figure 6:
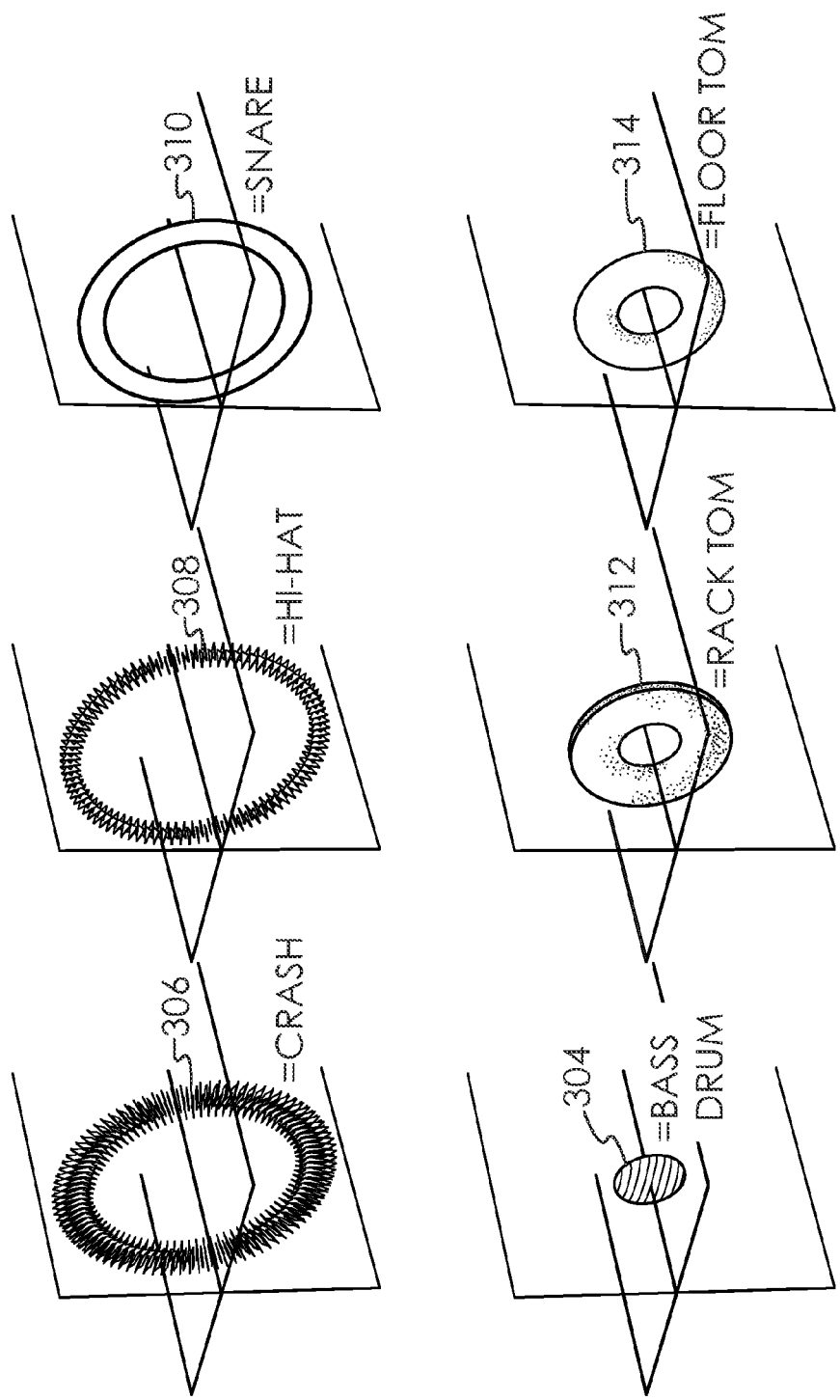
FIG. 6 includes perspective views of each of the indicators of various instrument sounding indicators used in FIGS. 3-5.
Figure 7B:
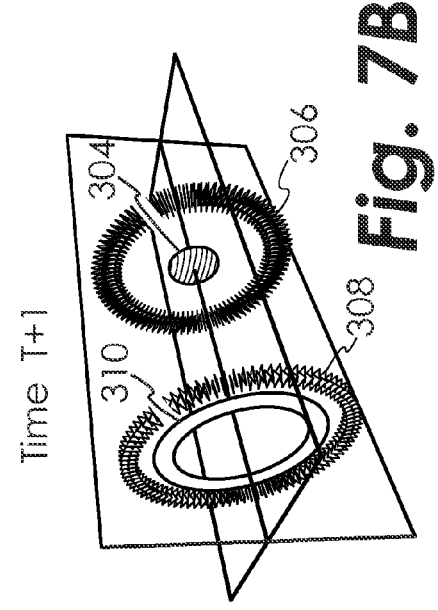
FIG. 7 includes perspective views taken at four points in time to demonstrate the real-time animation according to one embodiment.
Figure 7D:
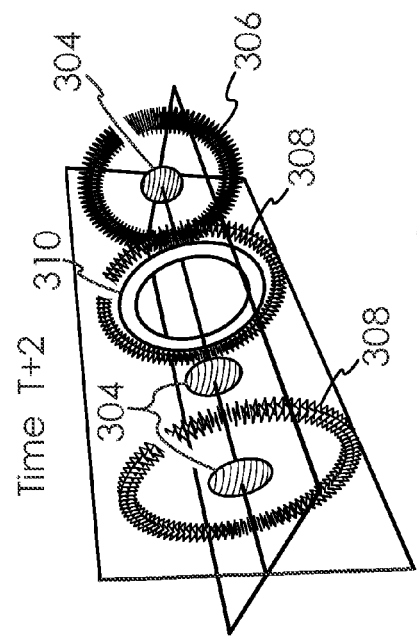
Figure 7A:
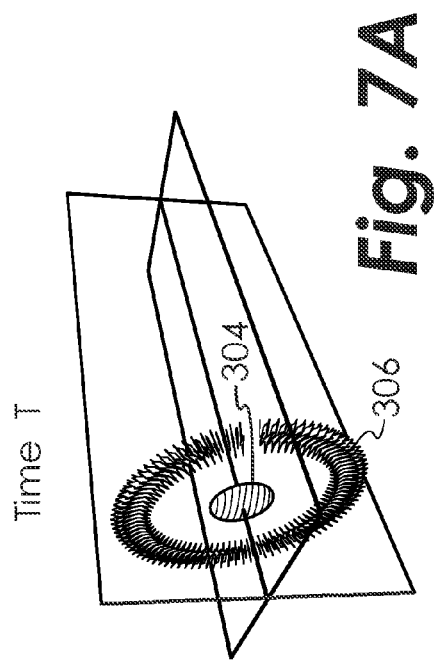
Figure 7C:
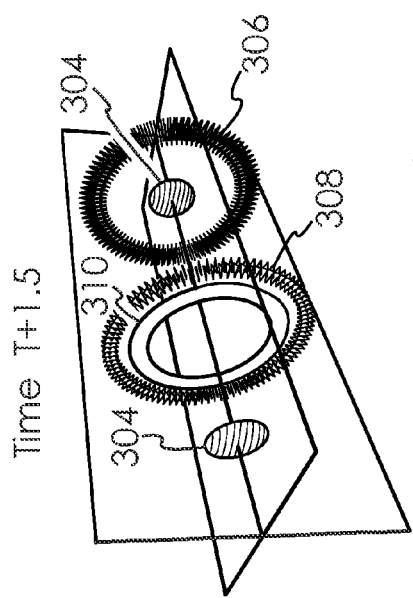

Referring now generally to FIGS. 2-6, the manners in which the sounding of the individual instruments in a drum kit are represented by the disclosed system and method are described. FIG. 6 is provided as an additional reference showing three dimensional representations of the individual instruments in a standard drum kit. A bass drum has a frequency that is perceived to be very low and often very "tight." Thus, in standard notation, the bass drum musical notation is generally written in the lowest space 214a of the staff 202, as shown, for example in FIG. 2. In the illustrated embodiment of the disclosed system and method the bass drum is represented by a bass drum spheroid 304 having a maximum diameter smaller than the maximum diameter of the floor tom toroid 314, rack tom toroid 312, snare toroid 310, hi-hat toroid 308 and crash toroid 306. This bass drum spheroid appears as a circle 404 or a short thin bar 504 in two dimensions as shown, for example, in FIGS. 4 and 5 respectively.

Figure 1:
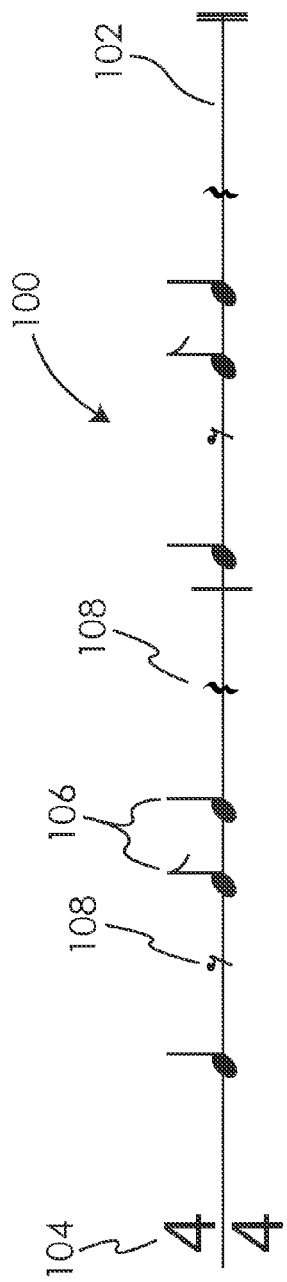
FIG. 1 is an example of prior art musical transcription of music for a single percussive instrument.
Figure 2:
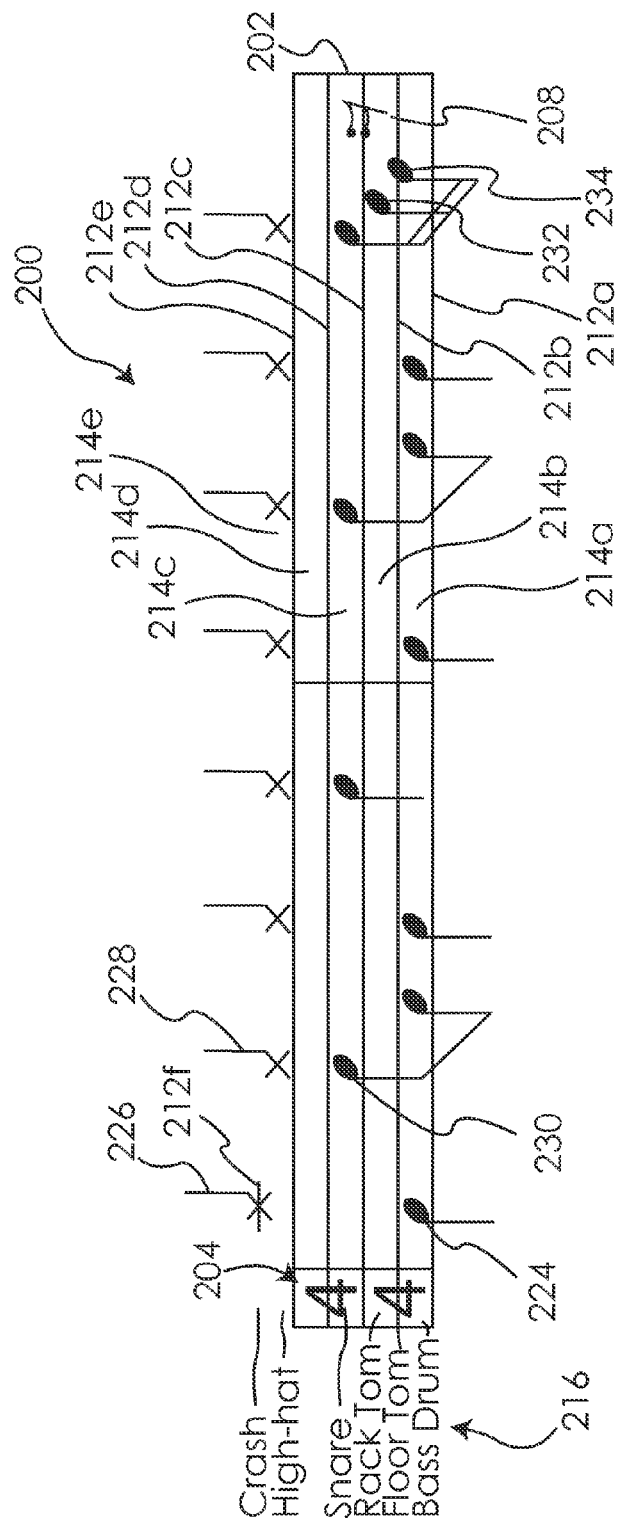
FIG. 2 is an example of prior art musical transcription of music for multiple percussive instruments.

The floor tom has a relatively low frequency that is somewhat "muddy." Thus, in standard notation, the floor tom musical notation is generally written on the second lowest line 212b of the staff 202, as shown, for example, in FIG. 2. In the illustrated embodiment of the disclosed system and method the floor tom sound is represented by a floor tom toroid 314 having a substantial thickness axially but thin thickness longitudinally, and a maximum diameter smaller than the maximum diameter of the crash toroid 306, hi-hat toroid 308, snare toroid 310 and rack tom toroid 312, but greater in diameter than the bass spheroid 304. This floor tom toroid 314 appears as a thick ring 414 or a short and thin bar 514 in two dimensions as shown, for example, in FIGS. 4 and 5 respectively.

The rack tom has a relatively low frequency (but higher than the floor tom) that is somewhat muddy also. Thus, in standard notation, the rack tom musical notation is generally written on the second lowest space 214b of the staff 202, as shown, for example, in FIG. 2. In the illustrated embodiment of the disclosed system and method the rack tom sound is represented by a rack tom toroid 312 having a substantial thickness axially but thin thickness longitudinally, and a maximum diameter smaller than the maximum diameter of the crash toroid 306, hi-hat toroid 308 and snare toroid 310, but greater in diameter than the floor tom toroid 314 and the bass spheroid 304. This rack tom toroid 312 appears as a thick ring 412 or a thin line 512 in two dimensions as shown, for example, in FIGS. 4 and 5 respectively.

A snare drum is generally perceived to have a frequency that is relatively high and very "crisp." Thus, in standard notation, the snare drum musical notation is generally written in the second highest space 214c of the staff 202, as shown, for example in FIG. 2. In the illustrated embodiment of the disclosed system and method the snare drum is represented by a snare toroid 310 having a small thickness axially and longitudinally, and a maximum diameter smaller than the maximum diameter of the crash toroid 306 and hi-hat toroid 308, but greater than the rack tom toroid 312, floor tom toroid 314 and bass spheroid 304. This snare toroid 310 appears as a thin ring 410 or thin line 510 in two dimensions as shown, for example, in FIGS. 4 and 5 respectively.

Because cymbals have a higher auditory frequency than drums, cymbal toroids have a resultantly larger diameter than any of the drums. Furthermore, the amorphous sound of a cymbal would, as opposed to the crisp sound of a snare, be visualized as a ring of varying thickness, much like the rings of a planet or a moon. The "splash" of the cymbal could then be animated as a shimmering effect within this ring. In one embodiment, the shimmering effect can be achieved by randomly varying the thickness of the toroid at different points over the circumference of the toroid during the time period in which the cymbal is being sounded. In another embodiment, various random light bursts or highlights can be displayed on the surface of the toroid. It shall be understood by those with skill in the art that other forms of image manipulation may be used to achieve this shimmer effect.

A hi-hat cymbal, while shown as having only a single hi-hat toroid 308 generates at least three general sounds: 1) when transitioned from the open to the closed position through the use of a foot peal, 2) when struck while in the closed position, and 3) when struck while in the open position. Each of these three sounds may, in certain embodiments, be represented by distinct toroids. The openly stuck hi-hat has a relatively high frequency and creates a "splash" sound. Thus, in standard notation, the hi-hat musical notation is generally written on the space 214e above the staff 202 as shown, for example, in FIG. 2. In the illustrated embodiment of the disclosed system and method the hi-hat sound is represented by a hi-hat toroid 308 having a medium thickness axially but wide thickness longitudinally, and a maximum diameter smaller than the maximum diameter of the crash toroid 306 but greater in diameter than the rack tom toroid 312, snare toroid 310, floor tom toroid 314 and the bass spheroid 304. This hi-hat toroid 308 appears as a medium thick ring 408 or a fairly wide bar 508 in two dimensions as shown, for example, in FIGS. 4 and 5 respectively.

The crash cymbal has a relatively high frequency and creates an exaggerated splash sound with a long decay period. Thus, in standard notation, the crash cymbal musical notation is generally written on a line 212f above the staff 202, as shown, for example, in FIG. 2. In the illustrated embodiment of the disclosed system and method, the crash cymbal is represented by a crash cymbal toroid 306 having a large varying thickness axially and wide thickness longitudinally, and a maximum diameter greater than the hi-hat toroid 308, rack tom toroid 312, snare toroid 310, floor tom toroid 314 and bass spheroid 304. This crash cymbal toroid 306 appears as a thick ring 406 or a fairly wide bar 506 in two dimensions as shown, for example, in FIGS. 4 and 5 respectively.

It shall be understood by those of ordinary skill in the art that other rhythm and percussion instruments may be represented using the principles of the disclosed method. For example, more complicated drum kits may have multiple floor toms and rack toms, in addition to a myriad of cymbals. Each of these individual components can be assigned similar or distinct graphical representations for display along the axis 302 as described hereinabove. In addition, other types of instruments may also be incorporated, such as cowbell, wood block, vibraslap, gong, tambourine and shaker. Even instruments not traditionally thought of as "percussive" can be represented using the disclosed method by selecting their graphical representation according to their general frequency range and timbre.

The 3-D visualization of this Rhythmical Component as shown, for example, in FIG. 3, results in imagery that appears much like a "wormhole" or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens.

To enhance the user's understanding of the particular piece of music, the 3-D wormhole image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube. FIGS. 7A, 7B, 7C and 7D show the resultant image at time t, t+1, t+1.5 and t+2, respectively. This would give the user the ability to see the spatial relationships of previous "beats" as they disappear, in logical patterns, into the distance. In one embodiment, the rhythmic structures would simply disappear once they reached the end of the tube or some specified distance from the "front" of the tube. In another embodiment, the displayed rhythmic structures can be made to slowly fade or "decay" into the background color as they travel towards the "back" of the tube. The two-dimensional view of FIG. 4 could also be modified to incorporate a perspective of the user looking straight "into" the three-dimensional tube or tunnel, with the graphical objects made to appear "right in front of" the user and then move away and into the tube, eventually shrinking into a distant center perspective point.

When implemented for display on a monitor there may be many adjustable display parameters, customizable to each user, for viewing this rhythmical tube. For example, the direction of the animation can be reversed to simulate the visual effect of the user traveling forward through the tube, as opposed to traveling backwards. This allows the user to anticipate the upcoming rhythmic structures in applications where the user is playing along with the displayed graphical representation, much like users read traditional sheet music as they play an instrument.

In another embodiment, the simulated travel effect can be turned off. In this embodiment, the elements remain stationary while a traveling cursor, indicating the current time mark, moves forward or backward through the tube as the various elements are sounded. In still further embodiments, instead of a traveling cursor, the elements themselves can be made to "pulse" dimensionally or brighten as they are sounded in real time. The camera viewing angle, transparency, scale, and resolution may also be adjusted by the user to optimize the displayed imagery.

In addition to variations in shape and spatial orientation, the disclosed system and method may incorporate the use of color to distinguish the different rhythmic structures within a composition of music. For example, a specific color can be assigned to each instrument within a drum kit. This gives the user a second distinguishing characteristic, in addition to shape, which allows the user quickly recognize the various graphical visualizations as they are displayed in real time.

Figure 8:
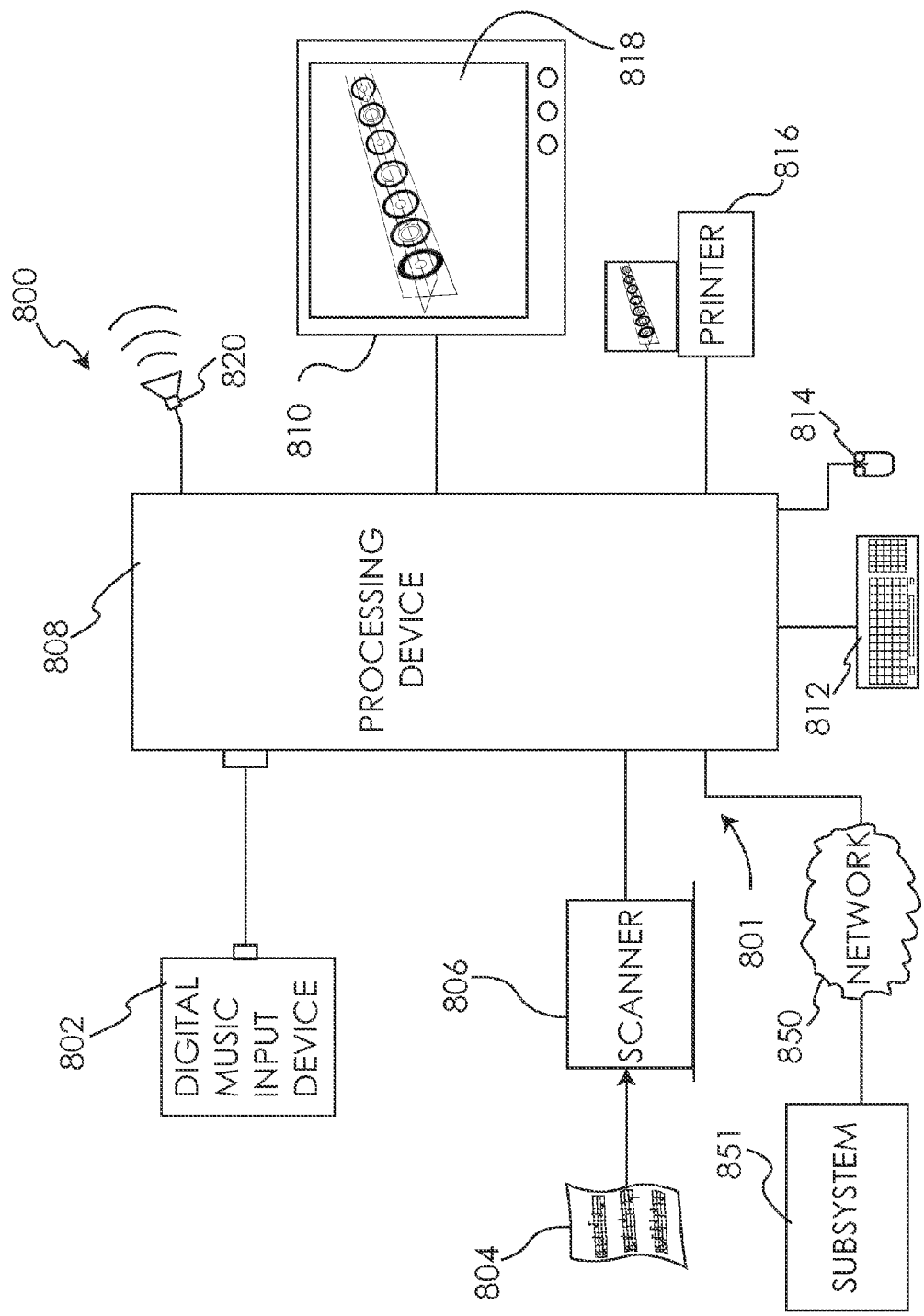
FIG. 8 is a block diagram of a system for generating a graphical user interface displaying the Rhythmical Visualization system.

With reference now to FIG. 8, there is shown a processor-based system for providing visual representation of music and sounds, indicated generally at 800. The system 800 may include a first subsystem 801 including a digital music input device 802, a sheet music input device 806 for inputting sheet music 804, a processing device 808, a display 810, user input devices such as keyboard 812 and mouse 814, a printer device 816 and one or more speakers 820. These devices are coupled to allow the input of music or other sounds, and the input of musical notation or other sound notation, into the processing device so that the music or sounds may be produced by the speaker 820 and the visual representations of the music or sounds may be displayed, printed or manipulated by users.

The digital music input device 802 may include a MIDI (Musical Instrument Digital Interface) instrument coupled via a MIDI port with the processing device 808, a digital music player such as an MP3 device or CD player, an analog music player, instrument or device with appropriate interface, transponder and analog-to-digital converter, or a digital music file, as well as other input devices and systems. As an example, an electronic drum kit with a MIDI interface may be connected to the processing device 808 and the diagrams discussed herein may be displayed on the display 810 as the instrument is played. Any musical instrument may be so interfaced.

The scanner 806 may be configured to scan written sheet music 804 in standard or other notation for input as a digital file into the processing device 808. Appropriate software running on a processor in the processing device 808 may convert this digital file into an appropriate digital music file representative of the music notated on the scanned sheet music 804. Additionally, the user input devices 812, 814 may be utilized to interface with music composition or other software running on the processing device 808 (or on another processor) to generate the appropriate digital music files.

The processing device 808 may be implemented on a personal computer, a workstation computer, a laptop computer, a palmtop computer, a wireless terminal having computing capabilities (such as a cell phone having a Windows CE or Palm operating system), a game terminal, or the like. It will be apparent to those of ordinary skill in the art that other computer system architectures may also be employed.

In general, such a processing device 808, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 810 is coupled to the bus for displaying information for a computer user and the input devices 812, 814 are coupled to the bus for communicating information and command selections to the processor. A mass storage interface for communicating with a data storage device containing digital information may also be included in processing device 808 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in an particular computer system. Display device 810 may be a liquid crystal device (LCD), a cathode ray tube (CRT), a plasma monitor, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device using the mass storage interface and downloads this information into random access memory for execution. The processor then executes an instruction stream from random access memory or read-only memory. Command selections and information that is input at input devices 812, 814 are used to direct the flow of instructions executed by the processor. Equivalent input devices 814 may also be a pointing device such as a conventional trackball device. The results of this processing execution are then displayed on display device 810.

The processing device 808 is configured to generate an output for display on the display 810 and/or for driving the printer 816 to print a hardcopy. Preferably, the video output to display 810 is also a graphical user interface, allowing the user to interact with the displayed information.

The system 800 may also include one or more subsystems 851 substantially similar to subsystem 801 and communicating with subsystem 801 via a network 850, such as a LAN, WAN or the internet. Subsystems 801 and 851 may be configured to act as a web server, a client or both and will preferably be browser enabled. Thus with system 800, remote teaching and music exchange may occur between users.

Figure 9:
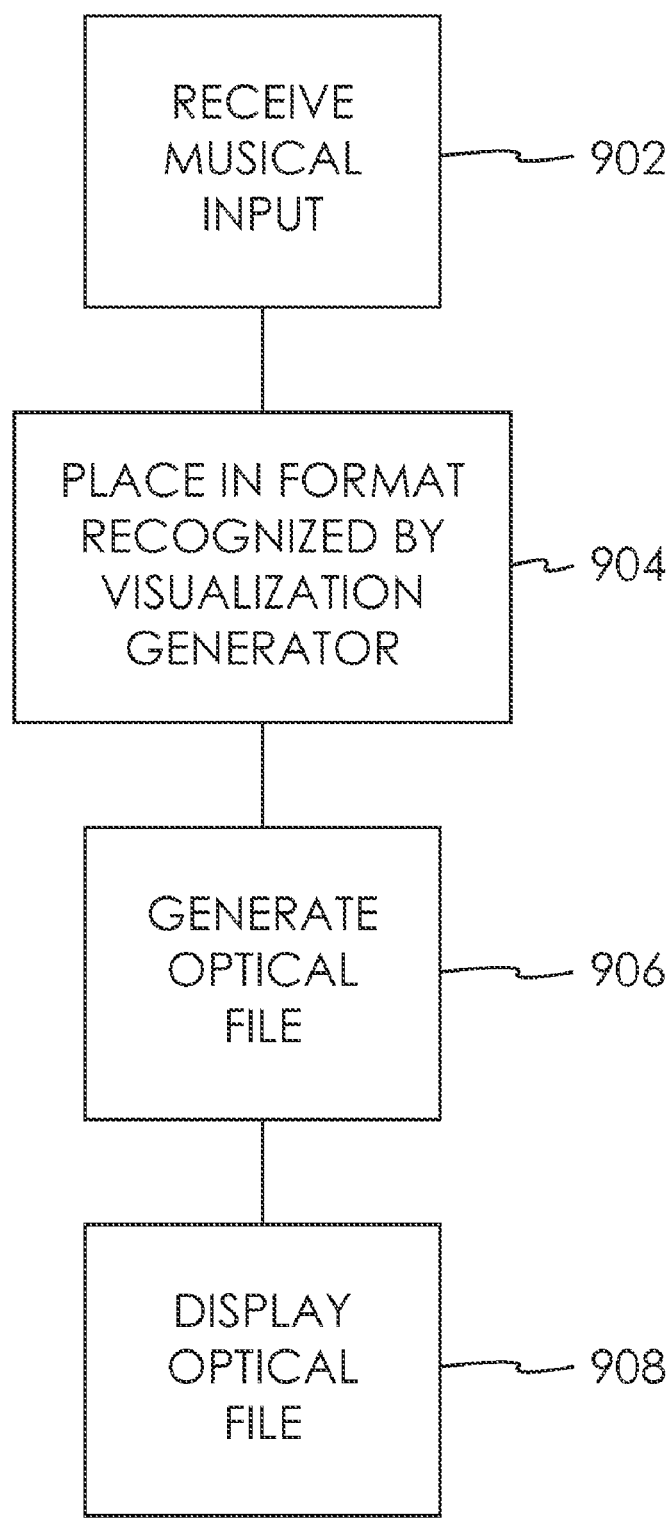
FIG. 9 is a very high level flow diagram of converting musical input to a visual representation of the rhythmic structure of the music.

FIG. 9 shows a block diagram illustrating one embodiment of the disclosed method of visualizing the rhythmic structure of music. In an initial receiving step 702, the system may receive various forms of "musical input." This input may be in the form of live music performed using a MIDI instrument, an electronic instrument or a miked acoustic instrument, recorded music played on an MP3, CD, tape or record player, a file containing digital music files, a scanned input of sheet music, music composed by a user interacting with composition software, or other forms of musical input. By way of a nonlimiting example, a user could play music on a MIDI compatible device (such as an electronic drum kit) and view the resulting graphical representation on the display in real time. This would help to reinforce the user's understanding of the rhythm structures, and provide entertainment for the user. In other embodiments, the user could use preformatted musical files and play along while viewing the resulting visual graphics for guidance and understanding. In step 704 the received musical input is placed in a format that is recognized by the visualization generator. In one embodiment, this format is a MIDI file that contains digital representations of the instant a sound is created, its pitch, and duration. In other embodiments, this format further comprises MIDI Downloadable Sounds (DLS) which are tailored for use with the musical composition. In step 706 an optical file is generated for displaying the music according to the disclosed manner of visualizing musical rhythmic content. In one embodiment, step 706 comprises calling software functions for generating spheres, rings, and toroids corresponding to the types of instruments whose sounds are reflected in the MIDI file. The resulting collection of rhythmic structure data is then stored to an optical file for later retrieval and/or manipulation. Step 708 includes generating a graphical user interface including the display of the rhythmic content of the music which allows user interaction with and manipulation of the displayed image.

In other embodiments of the disclosed invention, each sphere (whether it appears as such or as a circle or line) and each toroid (whether it appears as such or as a ring, line or bar) representing a beat when displayed on the graphical user interface will have an associated small "flag" or access control button. On Apple® Macintosh® computers, such access buttons are most often visualized as a small square. It will be recognized by those of ordinary skill in the art that other types of symbols may be used to represent the access control. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

Those having ordinary skill in the art will appreciate that the systems and methods of the present invention can be applied to any activity where an analysis of sound is useful, regardless of whether that sound is in the form of music or even if it is within the range of the audible human spectrum.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed:

1. A method for visualizing musical rhythmic structure, comprising the steps of:
   (a) receiving an input representing an occurrence of a musical rhythmic event;
   (b) assigning a visual representation to said input; and
   (c) displaying said visual representation along a time axis in two dimensions on a display;
   wherein:
      said visual representation comprises a first rectangular shape having a first height and first width if said input represents the sounding of a first rhythmic instrument, said first rhythmic instrument having a first primary frequency;
      said visual representation comprises a second rectangular shape having a second height and second width if said input represents the sounding of a second rhythmic instrument, said second rhythmic instrument having a second primary frequency that is higher than said first primary frequency, said second rectangular shape having a second height which is greater than said first height; and said visual representation comprises a third rectangular shape having a third height and third width if said input represents the sounding of a third rhythmic instrument, said third rhythmic instrument having a third primary frequency that is higher than said second primary frequency, said third rectangular shape having a third height which is greater than said second height.

2. The method of claim 1, wherein:

said first rectangular shape has a first width which corresponds to the duration of time over which said rhythmic event occurs;

said second rectangular shape has a second width which corresponds to the duration of time over which said rhythmic event occurs; and said third rectangular shape has a second width which corresponds to the duration of time over which said rhythmic event occurs.

3. The method of claim 1, wherein:

said first rhythmic instrument is a bass drum; and said second rhythmic instrument is selected from the group consisting of a floor tom, a rack torn, and a snare drum.

4. The method of claim 1, wherein:

said third rhythmic instrument is a cymbal.

5. The method of claim 1, further comprising the step of:

animating a plurality of said visual representations along said axis as said rhythmic events occur in real time.

6. The method of claim 5, wherein:

said visual representations move from left to right on said display as said rhythmic events occur in real time.

7. The method of claim 5, wherein:

said visual representations move from right to left on said display as said rhythmic events occur in real time.

\* \* \* \* \*

UNITED STATES PATENT AND TRADEMARK OFFICE
CERTIFICATE OF CORRECTION

PATENT NO. : 7,772,476 B2  Page 1 of 1
APPLICATION NO. : 12/484286
DATED : August 10, 2010
INVENTOR(S) : Kenneth R. Lemons It is certified that error appears in the above-identified patent and that said Letters Patent is hereby corrected as shown below:

In column 12, line 7, in claim 3, please replace "a rack torn" with --a rack tom--.

Signed and Sealed this
Twenty-sixth Day of April, 2011

David J. Kappos
*Director of the United States Patent and Trademark Office*